(12) United States Patent
Callahan (10) Patent No.: US 11,137,003 B1
(45) Date of Patent: Oct. 5, 2021

(54) HAT CLIP FLAG HOLDERS FOR SECURING FLAGS AND BANNERS TO HATS

(71) Applicant: Timothy Callahan, Branchburg, NJ (US)

(72) Inventor: Timothy Callahan, Branchburg, NJ (US)

( * ) Notice: Subject to any disclaimer, the term of this patent is extended or adjusted under 35 U.S.C. 154(b) by 0 days.

(21) Appl. No.: 16/951,501

(22) Filed: Nov. 18, 2020

(51) Int. Cl.
   *F16B 2/22* (2006.01)
   *A45F 5/02* (2006.01)

(52) U.S. Cl.
   CPC . *F16B 2/22* (2013.01); *A45F 5/02* (2013.01)

(58) Field of Classification Search
   CPC . Y10T 24/1394; Y10T 24/1335; G09F 17/00; G09F 2017/0075; A45F 5/02; A45F 5/08; F16B 2/22; F16B 2/20
   See application file for complete search history.

(56) References Cited

U.S. PATENT DOCUMENTS

| | | | |
|---|---|---|---|
| 3,104,644 A | 9/1963 | Burton | |
| 3,213,823 A | 10/1965 | Levy et al. | |
| 4,561,301 A | 12/1985 | Steele | |
| 4,905,406 A * | 3/1990 | Warner | A01M 1/02 |
| | | | 119/654 |
| 5,233,938 A * | 8/1993 | Lalo | B60R 13/005 |
| | | | 116/173 |
| 5,881,391 A | 3/1999 | Mullaney | |
| 6,378,453 B1 * | 4/2002 | Conway | G09F 17/00 |
| | | | 116/173 |
| 6,481,060 B1 | 11/2002 | Tsai | |
| 6,874,167 B1 | 4/2005 | Leszczynski | |
| 8,510,916 B2 | 8/2013 | Kinvi | |
| 2004/0006900 A1 | 1/2004 | Beller | |
| 2005/0268378 A1 | 12/2005 | Butler | |
| 2008/0040963 A1 | 2/2008 | Ochs et al. | |
| 2008/0295295 A1 | 12/2008 | Rogers | |
| 2010/0058972 A1 * | 3/2010 | Kinvi | G09F 17/00 |
| | | | 116/173 |

FOREIGN PATENT DOCUMENTS

| | | |
|---|---|---|
| DE | 2407140 | 8/1975 |
| JP | 3210174 | 5/2017 |

* cited by examiner

*Primary Examiner* — Robert Sandy
(74) *Attorney, Agent, or Firm* — Doherty IP Law Group LLC (57) ABSTRACT

A hat clip flag holder includes a flag holding tube having an upper end, a lower end, and an elongated conduit. The hat clip flag holder includes a clip and a placard connected with the flag holding tube. Elongated ribs project into the elongated conduit and taper for narrowing the cross-sectional dimension of the elongated conduit. A cap secured over the upper end of the flag holding tube includes a cylindrical wall having an upper end, a lower end, and a top wall that closes the upper end of the cap. The top wall has a central opening aligned with the elongated conduit and resilient fingers that surround the central opening. A flag secured to the hat clip flag holder includes a flagstaff with a first section engaging the elongated ribs and a second section engaging the resilient fingers of the cap.

20 Claims, 9 Drawing Sheets

HAT CLIP FLAG HOLDERS FOR SECURING FLAGS AND BANNERS TO HATS

BACKGROUND OF THE INVENTION

Field of the Invention

The present patent application is generally related to clips, and is more specifically related to hat clips that are used to hold flags.

Description of the Related Art

The have been a number of technological developments directed to securing flags and banners to hats. For example, U.S. Pat. No. 5,881,391 to Mullaney discloses a pair of flags bearing a sports team's colors or logo, which are carried by a pair of upstanding standards that are removably secured to the opposing sides of the visor of a baseball cap. The standards are bendable to permit them to assume a desired orientation (e.g., vertical) once attached to the visor. The standards are rotatable about their longitudinal axes so that the flags may be oriented as desired by the wearer.

U.S. Pat. No. 6,481,060 to Tsai discloses a multi-purpose cap clip including a clip unit, a holding device, and an accessory object. The clip unit has a fixing plate and two clasping plates for clasping a brim of a cap. After assembly of the structural parts, the cap clip is used to fasten an object (e.g., a flag) on the brim of the cap.

U.S. Pat. No. 6,874,167 to Leszczynski discloses a hat mountable flag for removably positioning a flag on a hat. The hat mountable flag includes a rod that is elongated and that has a first end and a second end. A flag is mounted on the rod. A fastener is attached to the second end of the rod for removably attaching the rod to the hat.

US 2008/0040963 to Ochs et al. discloses a device including a clip for use on hats. The device has a base and a clip for securing the device along the brim of a hat. The device includes a billboard element attached to the base for displaying visual indicia such as advertisement, logos, and messages. The device may include interlocking elements for stringing multiple clips together for forming a larger message.

US 2008/0295295 to Rogers discloses an assembly for securing a flag to a brim of a baseball cap. The assembly includes a clip that is securable to the brim of the baseball cap and a pole that extends up from the clip, which is adapted to fly a mini-flag.

U.S. Pat. No. 8,510,916 to Kinvi discloses a clip for securing a miniature flag to headgear. The clip has a cavity adapted to receive a flag pole or stick to enable a flag or banner float above the head of the bearer.

In spite of the above-identified advances, there remains a need for improved clips for securing flags to hats.

SUMMARY OF THE INVENTION

In one embodiment, a hat clip flag holder preferably includes a flag holding tube having an upper end, a lower end, and an elongated conduit extending from the upper end to the lower end thereof. In one embodiment, a clip and a placard are connected with the flag holding tube. The hat clip flag holder desirably includes at least one elongated rib projecting inwardly from an inner surface of the flag holding tube and into the elongated conduit of the flag holding tube.

In one embodiment, the at least one elongated rib preferably includes two or more elongated ribs projecting inwardly from the inner surface of the flag holding tube.

In one embodiment, the two or more elongated ribs are tapered so that a cross-sectional dimension of the elongated conduit is wider adjacent the upper end of the flag holding tube and narrower adjacent the lower end of the flag holding tube.

In one embodiment, the cross-sectional dimension of the elongated conduit preferably progressively narrows from the upper end to the lower end of the flag holding tube.

In one embodiment, each of the elongated ribs has a thickness that changes between the upper end and the lower end of the flag holding tube.

In one embodiment, the hat clip flag holder may include a cap secured over the upper end of the flag holding tube. In one embodiment, the cap preferably has a cylindrical wall with an upper end, a lower end, and a top wall that closes the upper end of the cylindrical wall. In one embodiment, the top wall preferably includes a central opening and one or more resilient fingers that extend inwardly for surrounding an outer perimeter of the central opening.

In one embodiment, the lower end of the cylindrical wall of the cap preferably defines an opening at an underside of the cap that is adapted to receive the upper end of the flag holding tube.

In one embodiment, the central opening of the cap is desirably aligned with the elongated conduit of the flag holding tube.

In one embodiment, the clip preferably includes an upper end that is adjacent the upper end of the flag holding tube and that is spaced away from an outer surface of the flag holding tube to define an open upper end of the clip, and a lower end that is adjacent the lower end of the flag holding tube and that is connected with the outer surface of the flag holding tube via an attachment flange to define a closed lower end of the clip.

In one embodiment, the placard preferably includes a front face that faces away from an outer surface of the flag holding tube, and a rear face that faces toward the outer surface of the flag holding tube and that is connected with the flag holding tube.

In one embodiment, the flag holding tube, the clip, and the placard may be integrally molded together to form a unitary molded structure.

In one embodiment, the flag holding tube, the clip, and the placard may be made of polymers, plastics, and metals, and combinations thereof.

In one embodiment, the cap may be made of polymers, plastics, rubbers, silicones, and thermoplastic elastomers, and combinations thereof.

In one embodiment, a hat clip flag holder desirably includes a flag holding tube having an upper end, a lower end, and an elongated conduit extending from the upper end to the lower end thereof, a clip integrally connected with the flag holding tube, and a placard integrally connected with the flag holding tube.

In one embodiment, two or more one elongated ribs desirably project inwardly from an inner surface of the flag holding tube and into the elongated conduit of the flag holding tube.

In one embodiment, a cap is secured over the upper end of the flag holding tube. The cap may include a cylindrical wall having an upper end, a lower end, and a top wall that closes the upper end of the cylindrical wall. In one embodiment, the top wall preferably has a central opening formed therein that is aligned with the elongated conduit of the flag holding tube. In one embodiment, the top wall preferably includes two or more resilient fingers that extend inwardly from the cylindrical wall of the cap for surrounding the central opening formed in the top wall of the cap.

In one embodiment, the two or more elongated ribs are desirably tapered so that a cross-sectional dimension of the elongated conduit is wider adjacent the upper end of the flag holding tube and narrower adjacent the lower end of the flag holding tube.

In one embodiment, the cross-sectional dimension of the elongated conduit progressively narrows from the upper end to the lower end of the flag holding tube.

In one embodiment, a flag is secured to the hat clip flag holder. In one embodiment, the flag desirably includes a flagstaff with a first flagstaff section in contact with the two or more elongated ribs of the flag holding tube and a second flagstaff section in contact with the resilient fingers of the cap.

In one embodiment, a hat clip flag holder preferably includes a flag holding tube having an upper end, a lower end, and an elongated conduit extending from the upper end to the lower end thereof. The elongated conduit preferably has a cross-sectional dimension that narrows between the upper end and the lower end of the flag holding tube.

In one embodiment, a clip is connected with the flag holding tube, and a placard is also connected with the flag holding tube.

In one embodiment, a cap is preferably secured over the upper end of the flag holding tube. The cap preferably includes a cylindrical wall having an upper end, a lower end, and a top wall that closes the upper end of the cylindrical wall. In one embodiment, the top wall desirably has a central opening formed therein that is aligned with the elongated conduit of the flag holding tube. In one embodiment, the top wall preferably includes two or more resilient fingers that extend inwardly from the cylindrical wall of the cap for surrounding the central opening formed in the top wall of the cap.

In one embodiment, a flag is secured to the hat clip flag holder. In one embodiment, the flag preferably has a flagstaff with a first section in contact with an inner surface of the flag holding tube and a second section in contact with the resilient fingers of the cap.

These and other preferred embodiments of the present patent application will be described in more detail herein.

DETAILED DESCRIPTION OF PREFERRED EMBODIMENTS

Referring to FIGS. 1-4, in one embodiment, a hat clip flag holder 100 preferably includes a flag holding tube 102 having an upper end 104 and a lower end 106. In one embodiment, the flag holding tube 102 preferably has an elongated conduit 108 or opening that extends from the upper end 104 to the lower end 106 thereof. In one embodiment, the lower end of the flag holding tube may be closed, for example, by an end wall.

In one embodiment, the hat clip flag holder 100 preferably includes a clip 110 that is connected with the flag holding tube 102. The clip 110 may be used for securing the hat clip flag holder 100 to an object such as a hat (e.g., the brim of a hat; the side of a hat). In one embodiment, the clip 110 preferably has an upper end 112 that is open and/or spaced away from the upper end 104 of the flag holding tube 102 and a lower end 114 that is closed and connected with the flag holding tube 102 via an attachment flange 116.

In one embodiment, the clip 110 is integrally formed with the flag holding tube 102. In one embodiment, the clip 110 and the flag holding tube 102 comprise a single molded piece (e.g., a molded plastic piece).

In one embodiment, the hat clip flag holder 100 preferably includes a placard 118 adapted to receive indicia such as advertising and/or stickers. In one embodiment, the indicia provided on the placard 118 may be associated with sports teams, NASCAR drivers, military, schools, universities, companies, musical bands, political parties, political candidates, etc. In one embodiment, the placard 118 preferably includes a front face 120 that is adapted to receive the indicia and a rear face 122 that faces away from the front face 120.

In one embodiment, the placard 118 is preferably integrally molded with the flag holding tube 102 and the clip 110. In one embodiment, the flag holding tube 102, the clip 110 and the placard 118 are integrally molded together to comprise a single piece of material. In one embodiment, the components of the hat clip flag holder 100 may be formed using a 3D printer.

Figure 5:
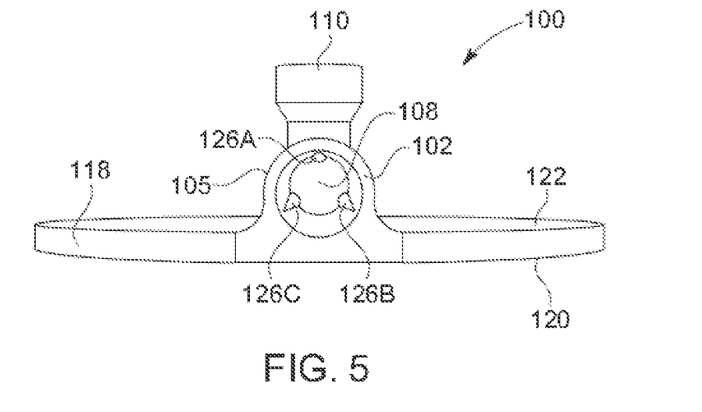
FIG. 5 is a top view of the hat clip flag holder shown in FIGS. 1-4.

Referring to FIG. 5, in one embodiment, the hat clip flag holder 100 preferably includes the clip 110 having an upper end 112 that is spaced away from the outer surface 105 of the flag holding tube 102 to provide a space or opening between the upper end 112 of the clip 110 and the outer surface 105 of the flag holding tube 102. As will be described in more detail herein, in one embodiment, the clip 110 may be utilized for securing the hat clip flag holder 100 to a hat, such as a baseball cap. In one embodiment, this may be accomplished by sliding a part of the hat into the opening at the upper end of the clip 110.

Figure 6:
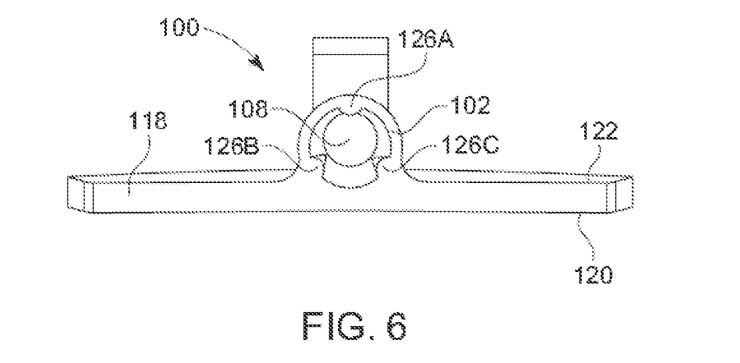
FIG. 6 is a bottom view of the hat clip flag holder shown in FIGS. 1-5.

Referring to FIGS. 5 and 6, in one embodiment, the clip 110 preferably has a lower end 116 that is secured to the flag holding tube 102 for forming a closed end of the clip 110.

In one embodiment, the flag holding tube 102 preferably has the elongated conduit 108 that extends from the upper end to the lower end of the flag holding tube 102. In one embodiment, the flag holding tube 102 desirably has an inner surface 124 that surrounds the elongated conduit 108 thereof. A flagstaff may be slid into the elongated conduit 108 of the flag holding tube 102 for securing a flag to the hat clip flag holder 100.

In one embodiment, the elongated ribs 126A-126C preferably extend between upper and lower ends of the flag holding tube 102. In one embodiment, the elongated ribs 126A-126C are preferably tapered so that the elongated ribs define a larger diameter opening adjacent the upper end of the flag holding tube 102 and a smaller diameter opening adjacent the lower end of the flag holding tube 102. In one embodiment, as a flagstaff is slid into the elongated conduit 108 of the flag holding tube 102 and toward the lower end 106 (FIG. 2) of the flag holding tube, the outer surface of the flagstaff preferably engages the tapered elongated ribs 126A-126C for forming a friction fit between the flagstaff and the ribs to secure the flagstaff to the flag holding tube. In one embodiment, the frictional engagement between the ribs 126A-126C and the flagstaff desirably secures and stabilizes the flagstaff to prevent the flagstaff from shifting and/or moving once it has formed a friction fit with the ribs.

In one embodiment, the hat clip flag holder 100 preferably includes the placard 118 having the front face 120 and the rear face 122. The placard 118 is preferably integrally molded with the flag holding tube 102, which, in turn, is integrally molded with the clip 110. The placard 118, and preferably the front face 128 of the placard 118, is adapted to contain indicia (e.g., a message, an advertisement, a sticker for a sports team, etc.). The indicia may be associated with the flag that is secured to the flag holding tube.

Figure 7:
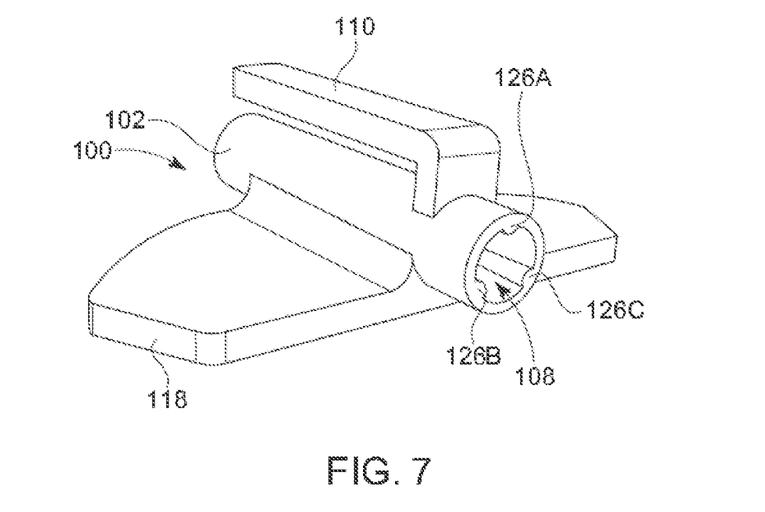
FIG. 7 is a perspective view of a bottom end of the hat clip flag holder shown in FIGS. 1-6.

Referring to FIG. 5-7, in one embodiment, the upper ends of the elongated ribs 126A-126C preferably define a larger diameter opening and the lower ends of the elongated ribs 126A-126C preferably define a smaller diameter opening. In one embodiment, as a flagstaff is slid into the upper end of the flag holding tube 102, the tapered elongated ribs 126A-126C will eventually form a friction fit with the outer surface of the flagstaff. Because the elongated ribs 126A-126C taper inwardly to define a smaller diameter opening adjacent the lower end of the flag holding tube, the lower end of the flagstaff will eventually form a friction fit with the elongated ribs 126A-126C for securing the lower end of the flagstaff within the flag holding tube 102 and preferably preventing the lower end of the flagstaff from moving beyond the lower end 106 of the flag holding tube 102.

Figure 8:
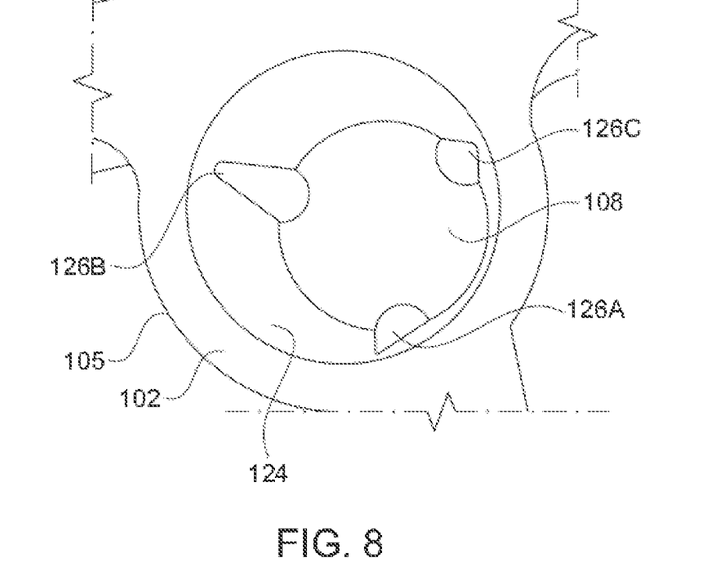
FIG. 8 is a magnified view of an upper end of a flag holding tube of the hat clip flag holder shown in FIGS. 1-7.

Referring to FIG. 8, in one embodiment, the flag holding tube 102 preferably has an outer surface 105 and an inner surface 124 that surrounds an elongated conduit 108 or opening that extends from the upper end 104 to the lower end 106 (FIG. 4) of the flag holding tube 102. In one embodiment, the flag holding tube 102 desirably includes the elongated ribs 126A-126C that extend between the upper end and the lower end of the flag holding tube 102. As noted above, the elongated ribs 126A-126C are preferably tapered so that the diameter of the elongated conduit adjacent the upper end of the flag holding tube is larger than the diameter of the elongated conduit adjacent the lower end of the flag holding tube.

Figure 9:
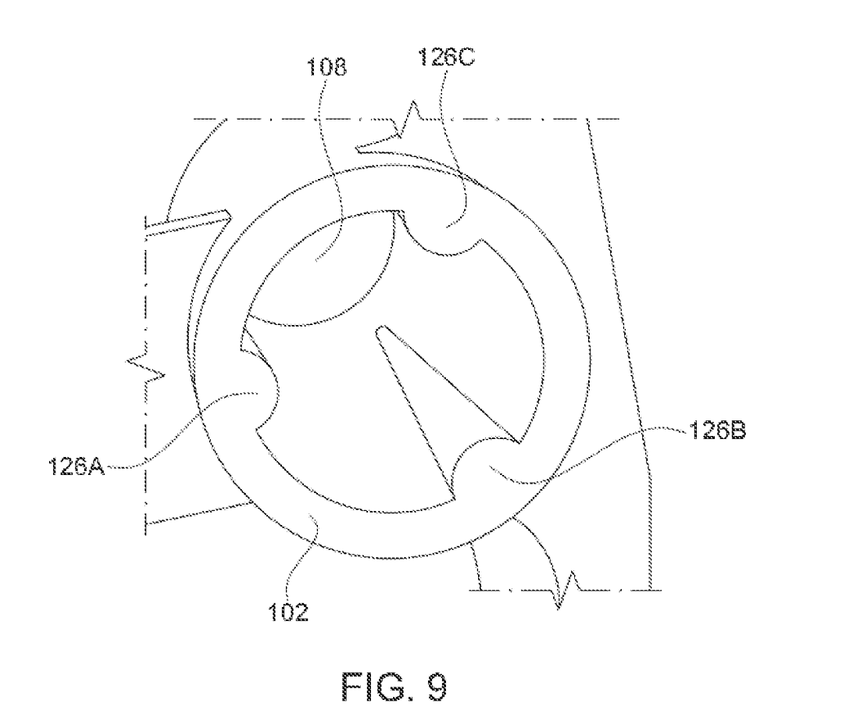
FIG. 9 is a magnified view of a lower end of the flag holding tube of the hat clip flag holder shown in FIGS. 1-8.

Referring to FIG. 9, in one embodiment, the elongated ribs 126A-126C preferably extend between the upper end 104 and the lower end 106 of the flag holding tube 102. In one embodiment, the elongated ribs 126A-126C are preferably tapered so that the inner diameter of the opening adjacent the lower end of the flag holding tube 102 is smaller than the inner diameter adjacent the upper end of the flag holding tube 102. The tapered ribs 126A-126C preferably act as a stop that engages a lower end of a flagstaff for forming a friction fit between the lower end of the flagstaff and the elongated ribs 126A-126C, which ensures that the lower end of the flagstaff is secured within the flag holding tube 102 and preferably does not extend below the lower end of the flag holding tube. In one embodiment, the lower end of the flag holding tube may be at least partially closed by an end wall or stop.

Figures 10, 11:
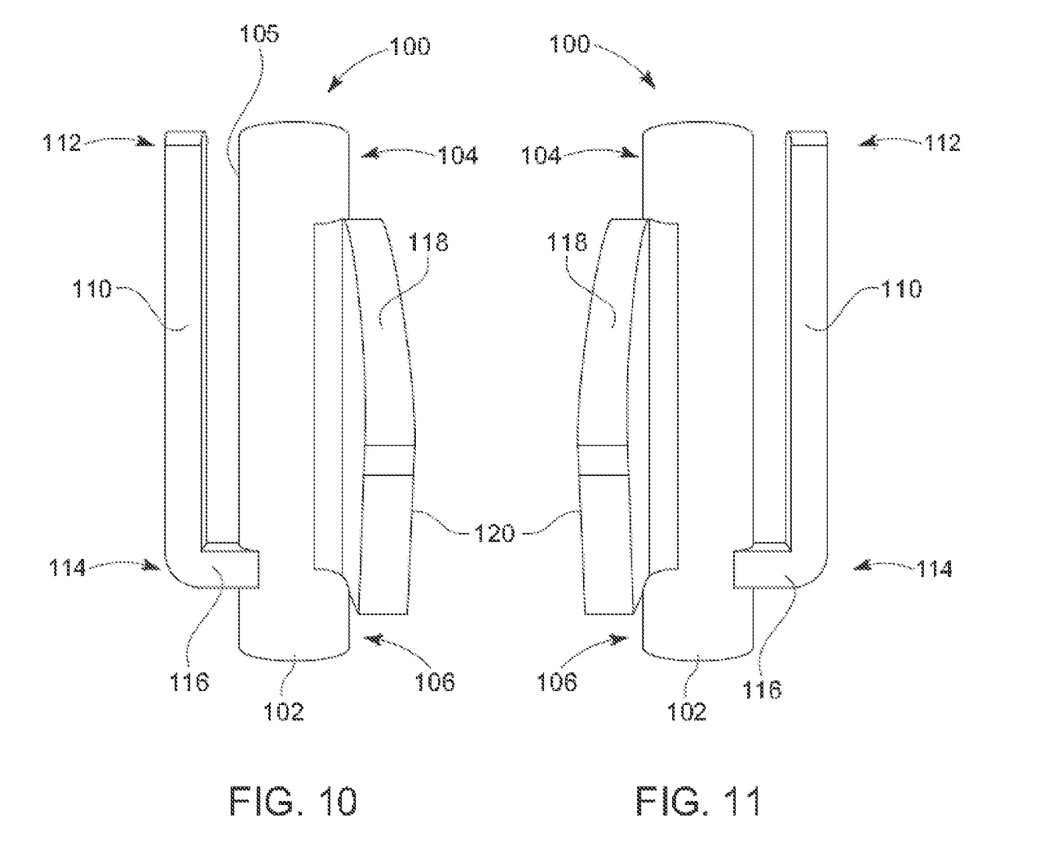
FIG. 10 is a left side view of the hat clip flag holder shown in FIG. 1-9.
FIG. 11 is a right side view of the hat clip flag holder shown in FIGS. 1-10.

Referring to FIGS. 10 and 11, in one embodiment, the hat clip flag holder 100 preferably includes the flag holding tube 102 having the upper end 104 and the lower end 106. The clip 110 has an upper end 112 that is spaced away from the outer surface 105 of the flag holding tube 102 at the upper end 104 of the flag holding tube 102. The clip 110 preferably includes a lower end 114 that is integrally connected with the flag holding tube 102 via an attachment flange 116. In one embodiment, the lower end 114 of the clip 110 and the attachment flange 116 preferably form a closed end of the clip 110.

In one embodiment, the hat clip flag holder 100 preferably includes the placard 118 that is integrally formed with the flag holding tube 102. The placard 118 preferably includes a front face 120 that faces away from the flag holding tube and rear face 122 that faces toward the flag holding tube 102. The front face 120 is preferably adapted to bear indicia (e.g., a banner advertisement, a sticker with a message, etc.).

Figure 1:
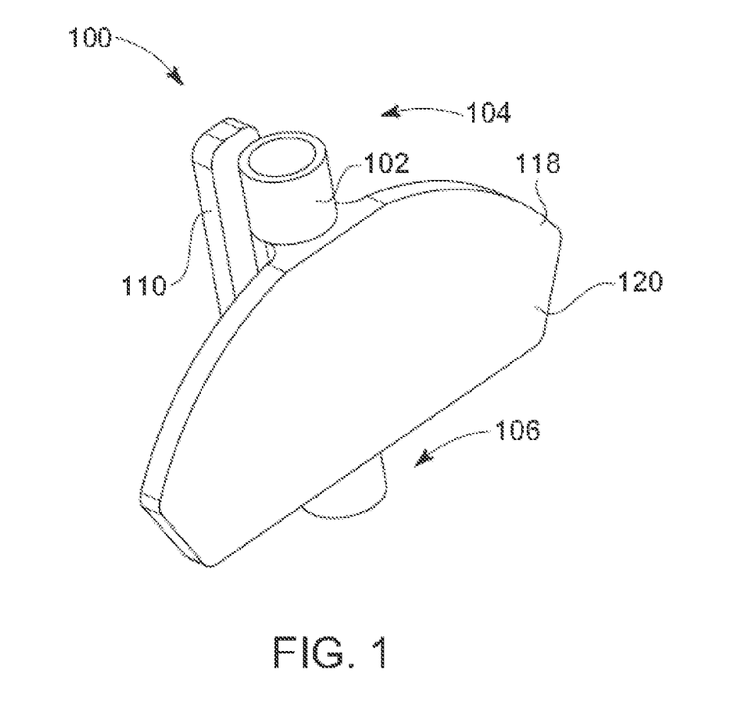
FIG. 1 is a perspective view of a front side of a hat clip flag holder, in accordance with one embodiment of the present patent application.
Figure 2:
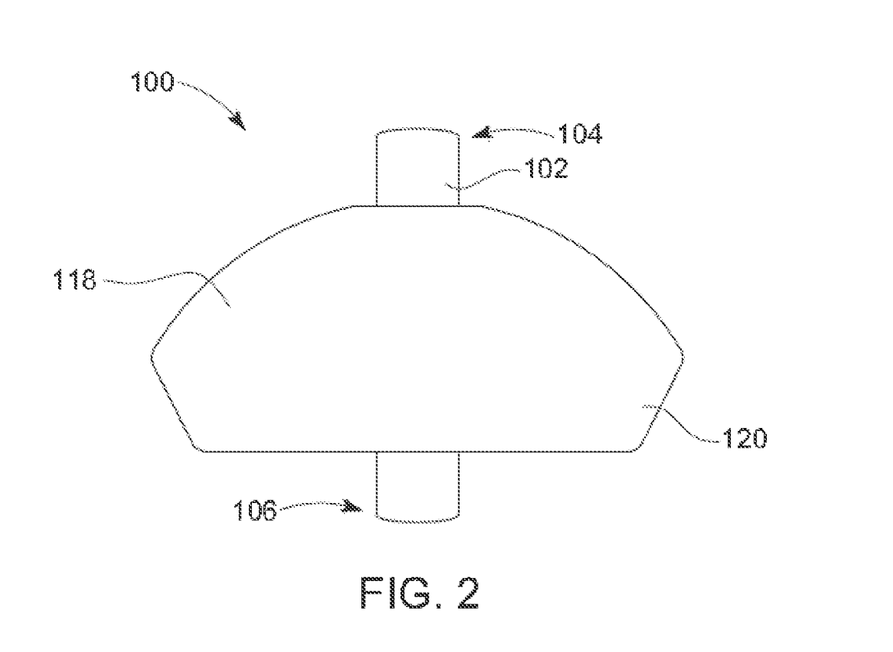
FIG. 2 is a front elevation view of the hat clip flag holder shown in FIG. 1.
Figure 3:
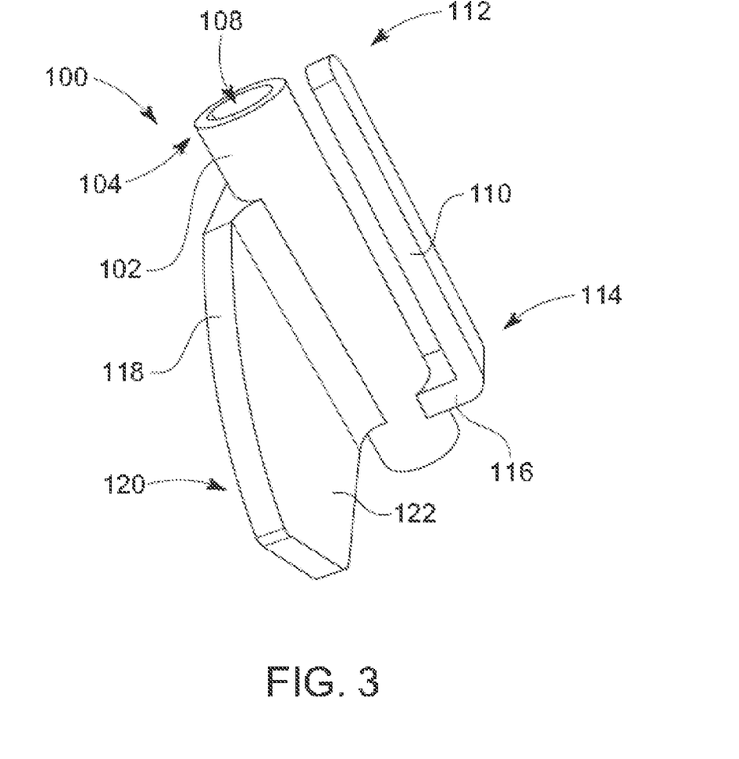
FIG. 3 is a perspective view of a rear side of the hat clip flag holder shown in FIGS. 1 and 2.
Figure 4:
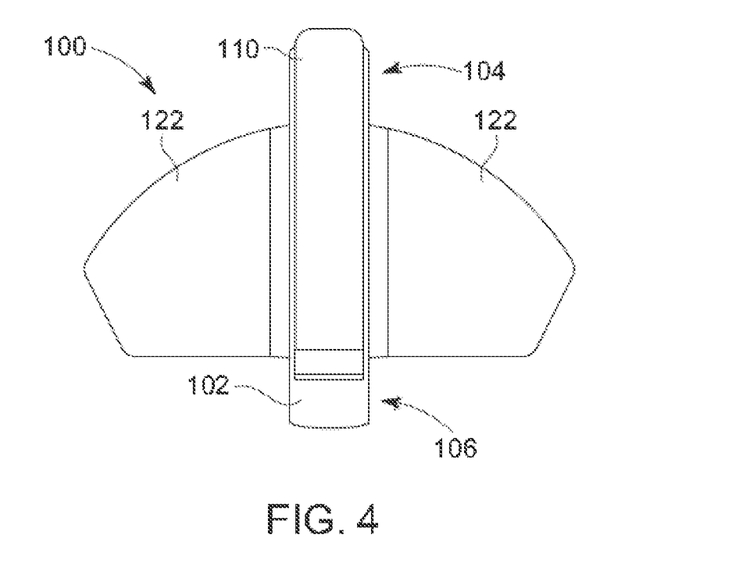
FIG. 4 is a rear elevation view of the hat clip flag holder shown in FIGS. 1-3.
Figure 12A:
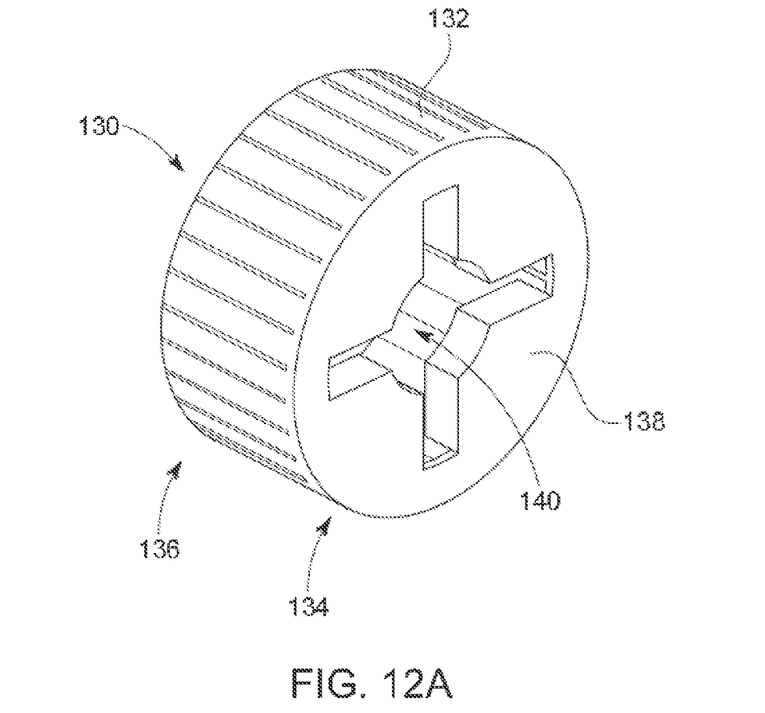
FIG. 12A is a perspective view of a top side of a cap of a hat clip flag holder, in accordance with one embodiment of the present patent application.
Figure 12B:
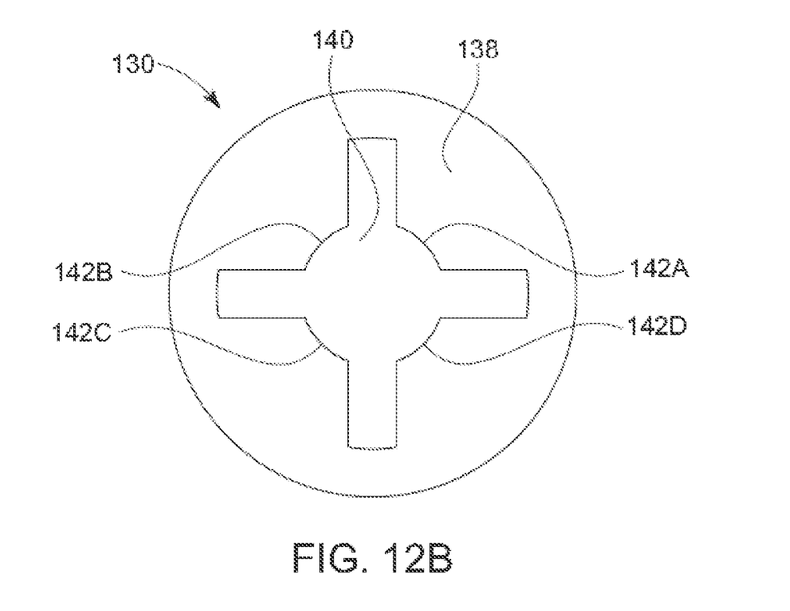
FIG. 12B is a top view of the cap shown in FIG. 12A.

Referring to FIGS. 12A and 12B, in one embodiment, the hat clip flag holder 100 (FIG. 1) preferably includes a cap 130 that is adapted to be secured over the upper end of the flag holding tube 102 (FIG. 11). In one embodiment, the cap 130 preferably includes a cylindrical outer wall 132 having an upper end 134 and a lower end 136. The upper end 134 of the cylindrical outer wall 132 is preferably closed by a top wall 138 and the lower end 136 of the cylindrical outer wall 132 is preferably open for enabling the cap 130 to be secured over the tube-shaped upper end of the flag holding tube 102 (FIG. 11). In one embodiment, the top wall 138 preferably has a central opening 140 formed therein that is in communication with the larger opening at the lower end 136 of the cylindrical wall 132. In one embodiment, the top wall 138 preferably has resilient fingers 142A-142D that surround the central opening 140. In one embodiment, the resilient fingers 142A-142D are adapted to engage an outer surface of a flagstaff for securing and/or stabilizing the flagstaff within the flag holding tube 102 of the hat clip flag holder 100 (FIG. 1).

In one embodiment, the cap 130 may be made of a material that is adapted to stretch over the upper end of the flag holding tube 102 (FIG. 11). In one embodiment, the cap 130 may be made of thermoplastic elastomer (TPE) materials. In one embodiment, the cap 130 may be made of rubber, plastic, and/or silicone.

Figure 12C:
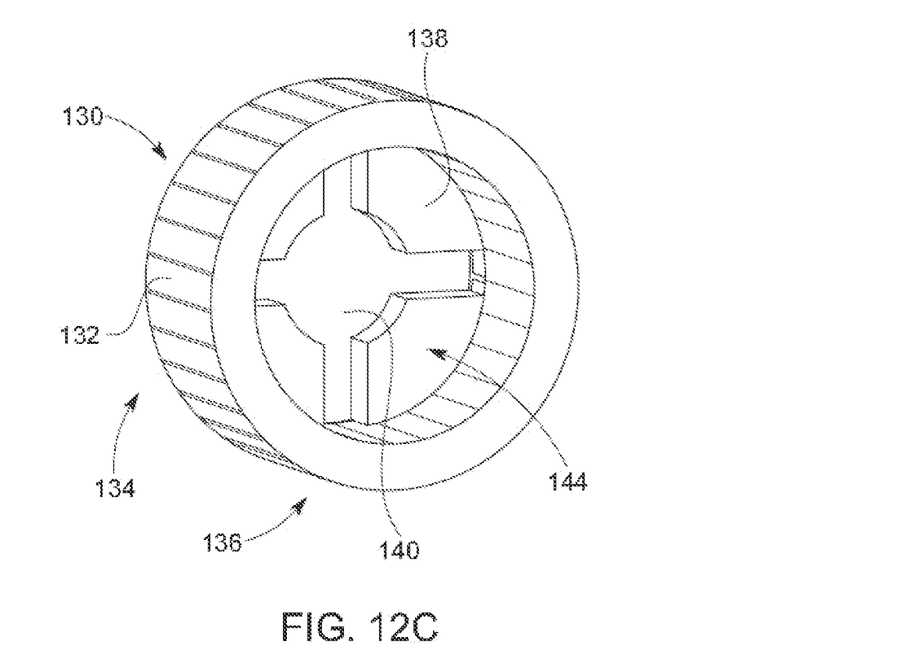
FIG. 12C is a perspective view of an underside of the cap shown in FIGS. 12A and 12B.
Figure 12D:
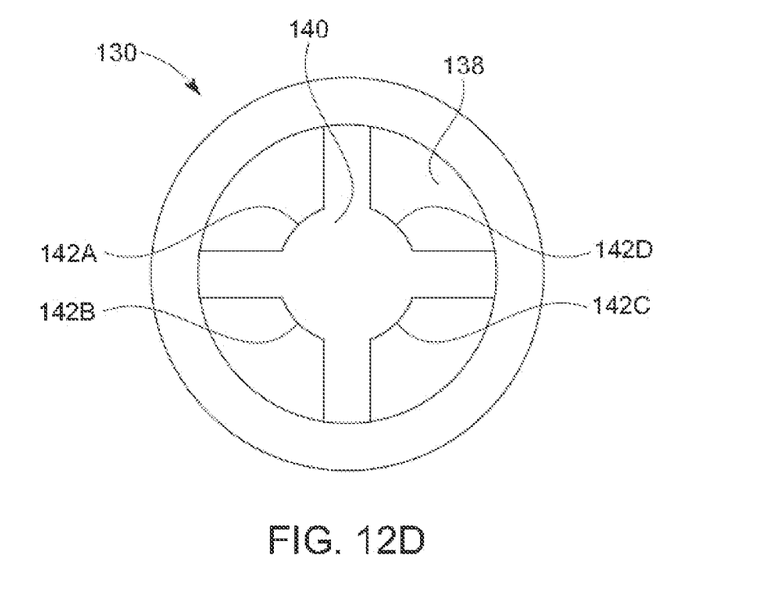
FIG. 12D is a bottom view of the cap shown in FIGS. 12A-12C.

Referring to FIGS. 12C and 12D, in one embodiment, the cap 130 preferably has a tube receiving opening 144 located at the lower end 136 of the cylindrical wall 132 thereof. The tube receiving opening 144 preferably has an inner diameter that is less than or equal to the outer diameter of the flag holding tube to form a press fit between the inner surface of the cylindrical wall 132 of the cap 130 and the outer surface of the flag holding tube 102 (FIG. 11).

The top wall 138 preferably closes the upper end 134 of the cylindrical wall 132 of the cap 130. The top wall 138 desirably has a central opening 140 formed therein that is adapted to receive a flagstaff of a flag. The top wall 138 preferably includes the resilient fingers 142A-142D that surround the central opening 140 and/or that project inwardly toward the central opening 140. The resilient fingers 142A-142D preferably have free ends that are adapted to engage an outer surface of a flagstaff for securing and/or stabilizing the flagstaff of a flag within the central opening 140 of the cap 130.

Figure 13:
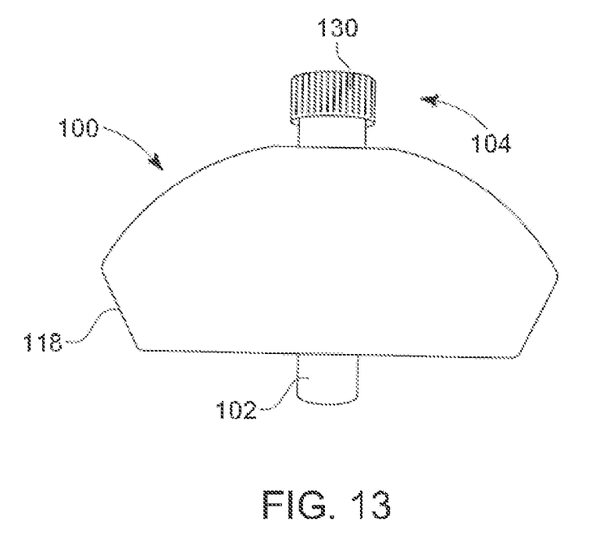
FIG. 13 is a front view of a hat clip flag holder including a cap assembled with an upper end of a flag holding tube, in accordance with one embodiment of the present patent application.

Referring to FIG. 13, in one embodiment, the hat clip flag holder 100 preferably includes the flag holding tube 102 and the placard 118 that is integrally formed with the flag holding tube 102. The cap 130 (FIGS. 12A-12D) is secured over the upper end 104 of the flag holding tube 102. In one embodiment, the cap 130 is formed of a material that stretches over the outer diameter of the flag holding tube 102 at the upper end 104 of the flag holding tube 102.

Figure 14:
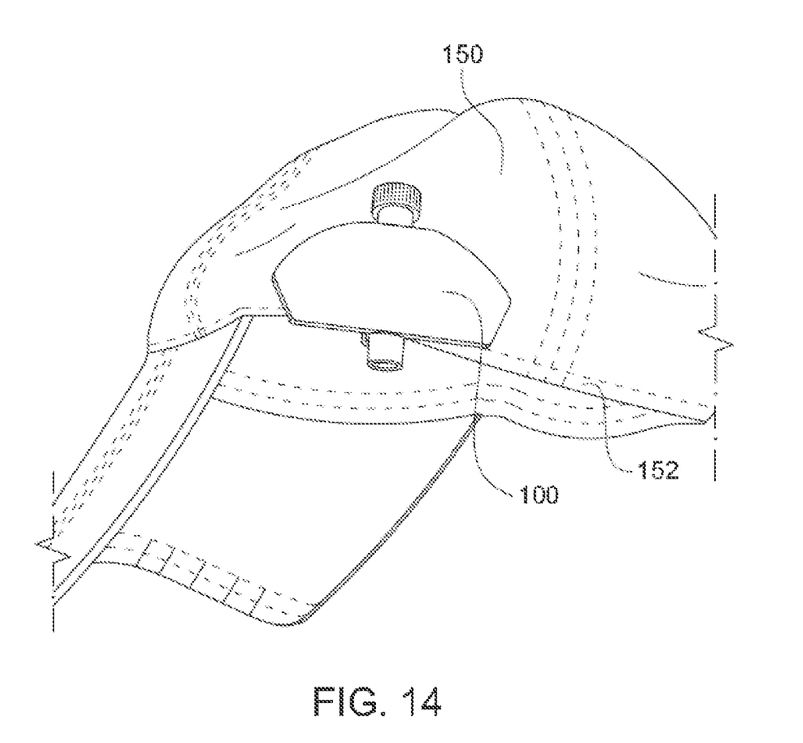
FIG. 14 shows the hat clip flag holder of FIG. 13 after being secured to a hat, in accordance with one embodiment of the present patent application.

Referring to FIG. 14, in one embodiment, the clip 110 (FIG. 11) is utilized for securing the hat clip flag holder 100 to a hat 150. In one embodiment, the open end of the clip is slid over a bottom edge 152 of the cap 150 to secure the hat clip flag holder 100 to the hat 150.

Figure 15:
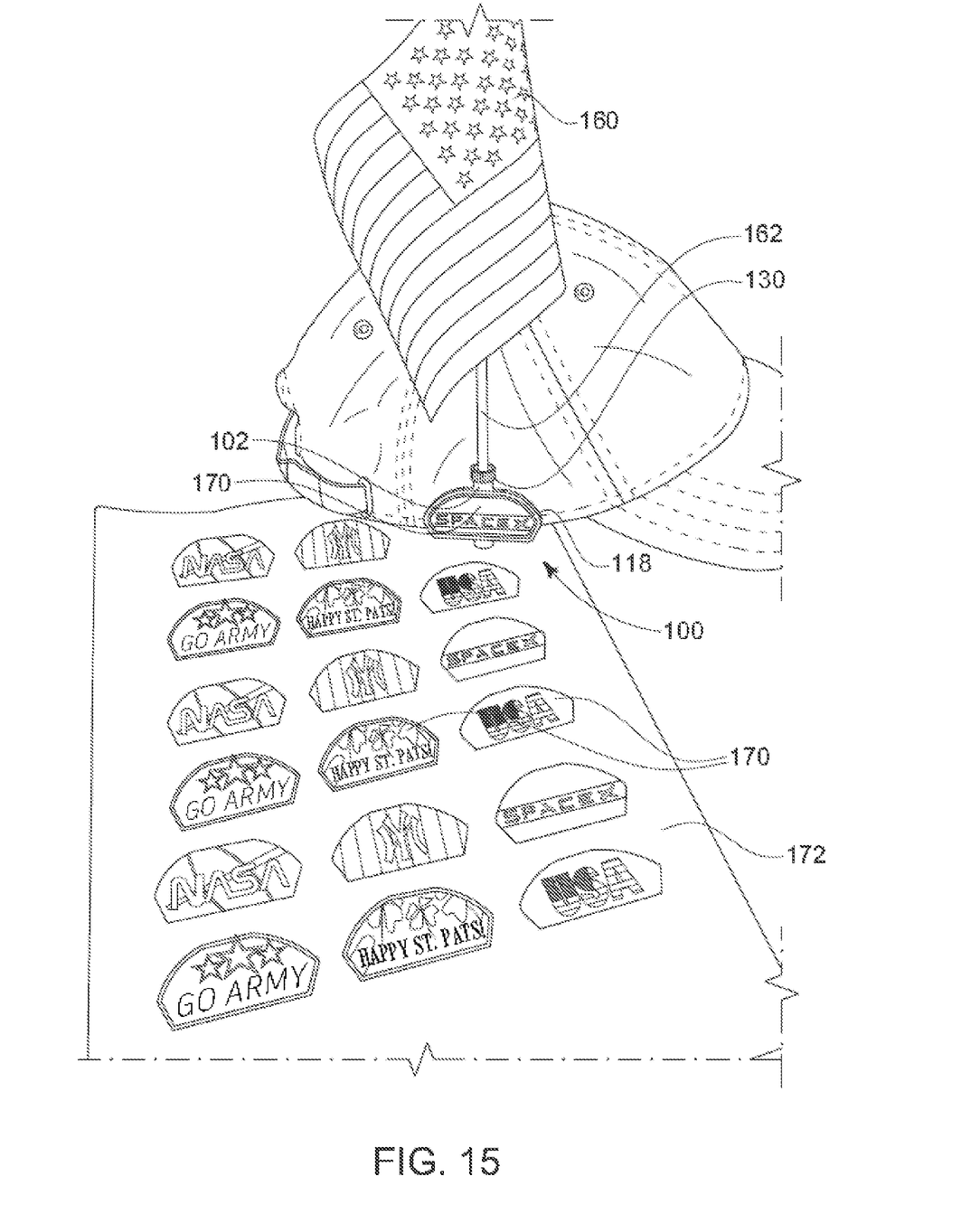
FIG. 15 is a perspective view of a hat clip flag holder and a flag secured to the hat clip flag holder, in accordance with one embodiment of the present patent application.

Referring to FIG. 15, in one embodiment, a flag 160 including a flagstaff 162 may be assembled with a hat clip flag holder 100 having a flag holding tube 102, a clip 110 (FIG. 1), and a placard 118. In one embodiment, the hat clip flag holder 100 preferably includes a cap 130 secured to the upper end of the flag holding tube 102. In one embodiment, the flagstaff 162 is passed through the central opening 140 (FIG. 12B) of the cap 130 for securing a lower end of the flagstaff 162 within the flag holding tube 102. The resilient fingers 142A-142D (FIG. 12B) of the cap 130 preferably engage the outer surface of the flagstaff 130 for securing and/or stabilizing the flagstaff 162 within the elongated conduit of the flag holding tube 102 of the hat clip flag holder 100.

In one embodiment, the tapered elongated ribs 126A-126C (FIGS. 5-7) that extend along the inside of the flag holding tube 102 preferably engage the outer surface of the flagstaff 162 for further stabilizing the flagstaff 162 within the flag holding tube 102. As described herein, the elongated ribs 126A-126C (FIGS. 5-7) are tapered so that the opening adjacent the lower end of the flag holding tube 102 is smaller in diameter for acting as a stop and/or forming a friction fit with the flagstaff 162 to prevent a lower end of the flagstaff from passing beyond the lower end of the flag holding tube 102. The resilient fingers 142A-142D of the cap 130 engage an upper section of the flagstaff for further stabilizing the flagstaff within the flag holding tube 102.

In one embodiment, stickers 170 may be applied to the front face 120 of the placard 118 of the hat clip flag holder 100. The stickers may be advertisements and/or related to branches of the military, sports teams, NASCAR drivers, PGA Tour golfers, schools, universities, political parties, etc. In one embodiment, a sheet 172 may contain a plurality of stickers 170, whereby each sticker is associated with a different entity (e.g., a different sports team). In one embodiment, an individual may remove a sticker 170 from the sheet 172 and apply the sticker to the placard 118 to customize the hat clip flag holder 100.

In one embodiment, the indicia such as advertising may be printed onto the front face of the placard 118 such as by using laser printing, silk screen printing, pad printing, etc.

While the foregoing is directed to embodiments of the present invention, other and further embodiments of the invention may be devised without departing from the basic scope thereof, which is only limited by the scope of the claims that follow. For example, the present invention contemplates that any of the features shown in any of the embodiments described herein, or incorporated by reference herein, may be incorporated with any of the features shown in any of the other embodiments described herein, or incorporated by reference herein, and still fall within the scope of the present invention.

What is claimed is:

1. A hat clip flag holder comprising:
   a flag holding tube having an upper end, a lower end, and an elongated conduit extending from the upper end to the lower end thereof;
   a clip connected with said flag holding tube;
   a placard connected with said flag holding tube, wherein said placard comprises a front face that faces away from an outer surface of said flag holding tube, and a rear face that faces toward the outer surface of said flag holding tube and that is connected with said flag holding tube;
   at least one elongated rib projecting inwardly from an inner surface of said flag holding tube and into the elongated conduit of said flag holding tube.

2. The hat clip flag holder as claimed in claim 1, wherein said at least one elongated rib comprises two or more elongated ribs projecting inwardly from the inner surface of said flag holding tube.

3. The hat clip flag holder as claimed in claim 2, wherein said two or more elongated ribs are tapered so that a cross-sectional dimension of said elongated conduit is wider adjacent the upper end of said flag holding tube and narrower adjacent the lower end of said flag holding tube.

4. The hat clip flag holder as claimed in claim 3, wherein the cross-sectional dimension of said elongated conduit progressively narrows from the upper end to the lower end of said flag holding tube.

5. The hat clip flag holder as claimed in claim 3, wherein each of said elongated ribs has a thickness that changes between the upper end and the lower end of said flag holding tube.

6. The hat clip flag holder as claimed in claim 1, further comprising:
   a cap secured over the upper end of said flag holding tube;
   said cap including a cylindrical wall having an upper end, a lower end, and a top wall that closes the upper end of said cylindrical wall;
   said top wall having a central opening and one or more resilient fingers that extend inwardly for surrounding an outer perimeter of the central opening.

7. The hat dip flag holder as claimed in claim 6, wherein the lower end of said cylindrical wall defines an opening at an underside of said cap that is adapted to receive the upper end of said flag holding tube.

8. The hat clip flag holder as claimed in claim 6, wherein the central opening of said cap is aligned with the elongated conduit of said flag holding tube.

9. The hat clip flag holder as claimed in claim 6, wherein said cap is made of materials selected from the group consisting of polymers, plastics, rubbers, silicones, and thermoplastic elastomers.

10. The hat clip holder as claimed in claim 1, wherein said clip comprises:
   an upper end that is adjacent the upper end of said flag holding tube and that is spaced away from an outer surface of said flag holding tube to define an open upper end of said clip;
   a lower end that is adjacent the lower end of said flag holding tube and that is connected with the outer surface of said flag holding tube via an attachment flange to define a closed lower end of said clip.

11. The hat clip flag holder as claimed in claim 1, wherein said flag holding tube, said clip, and said placard are integrally molded together to form a unitary molded structure.

12. The hat clip flag holder as claimed in claim 1, wherein said flag holding tube, said clip, and said placard are made of materials selected from the group consisting of polymers, plastics, and metals.

13. A hat clip flag holder comprising:
   a flag holding tube having an upper end, a lower end, and an elongated conduit extending from the upper end to the lower end thereof;
   a clip connected with said flag holding tube, wherein said clip comprises an upper end that is adjacent the upper end of said flag holding tube and that is spaced away from an outer surface of said flag holding tube to define an open upper end of said clip, a lower end that is adjacent the lower end of said flag holding tube and that is connected with the outer surface of said flag holding tube via an attachment flange to define a closed lower end of said clip;
   a placard connected with said flag holding tube;
   at least one elongated rib projecting inwardly from an inner surface of said flag holding tube and into the elongated conduit of said flag holding tube.

14. A hat clip flag holder comprising:
   a flag holding tube having an upper end, a lower end, and an elongated conduit extending from the upper end to the lower end thereof;
   a clip integrally connected with said flag holding tube;
   a placard integrally connected with said flag holding tube;
   two or more one elongated ribs projecting inwardly from an inner surface of said flag holding tube and into the elongated conduit of said flag holding tube;
   a cap secured over the upper end of said flag holding tube, said cap including a cylindrical wall having an upper end, a lower end, and a top wall that closes the upper end of said cylindrical wall, said top wall having a central opening formed therein that is aligned with the elongated conduit of said flag holding tube, said top wall including two or more resilient fingers that extend inwardly from the cylindrical wall of said cap for surrounding the central opening formed in said top wall of said cap.

15. The hat clip flag holder as claimed in claim 14, wherein said two or more elongated ribs are tapered so that a cross-sectional dimension of said elongated conduit is wider adjacent the upper end of said flag holding tube and narrower adjacent the lower end of said flag holding tube.

16. The hat clip flag holder as claimed in claim 15, wherein the cross-sectional dimension of said elongated conduit progressively narrows from the upper end to the lower end of said flag holding tube.

17. The hat clip flag holder as claimed in claim 14, wherein said flag holding tube, said clip, and said placard are made of materials selected from the group consisting of polymers, plastics, and metals, and wherein said cap is made of materials selected from the group consisting of polymers, plastics, rubbers, silicones, and thermoplastic elastomers.

18. The hat clip flag holder as claimed in claim 14, further comprising a flag secured to said hat clip flag holder, said flag having a flagstaff with a first flagstaff section in contact with said two or more elongated ribs and a second flagstaff section in contact with said resilient fingers of said cap.

19. A hat clip flag holder comprising:
   a flag holding tube having an upper end, a lower end, and an elongated conduit extending from the upper end to the lower end thereof, wherein said elongated conduit has a cross-sectional dimension that narrows between the upper end and the lower end of said flag holding tube;
   a clip connected with said flag holding tube;
   a placard connected with said flag holding tube;
   a cap secured over the upper end of said flag holding tube, said cap including a cylindrical wall having an upper end, a lower end, and a top wall that closes the upper end of said cylindrical wall, said top wall having a central opening formed therein that is aligned with the elongated conduit of said flag holding tube, said top wall including two or more resilient fingers that extend inwardly from the cylindrical wall of said cap for surrounding the central opening formed in said top wall of said cap.

20. The hat clip flag holder as claimed in claim 19, further comprising a flag secured to said hat clip flag holder, said flag having a flagstaff with a first section of said flagstaff in contact with an inner surface of said flag holding tube and a second section of said flagstaff in contact with said resilient fingers of said cap.

* * * * *